United States Patent
Dean et al.

(10) Patent No.: US 12,524,757 B1
(45) Date of Patent: *Jan. 13, 2026

(54) CREDIT CARD ACCOUNT DATA EXTRACTION

(71) Applicant: ConsumerInfo.com, Inc., Costa Mesa, CA (US)

(72) Inventors: Michael John Dean, Torrance, CA (US); Mark Joseph Kapczynski, Santa Monica, CA (US)

(73) Assignee: ConsumerInfo.com, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/418,088

(22) Filed: Jan. 19, 2024

Related U.S. Application Data

(63) Continuation of application No. 16/289,110, filed on Feb. 28, 2019, now abandoned, which is a continuation of application No. 13/706,996, filed on Dec. 6, 2012, now Pat. No. 10,255,598.

(51) Int. Cl.
*G06Q 20/36* (2012.01)
*G06Q 20/00* (2012.01)

(52) U.S. Cl.
CPC ........ *G06Q 20/363* (2013.01); *G06Q 20/00* (2013.01)

(58) Field of Classification Search
CPC ................................................ G06Q 40/00
USPC .......................................................... 705/35
See application file for complete search history.

(56) References Cited

U.S. PATENT DOCUMENTS

| | | | |
|---|---|---|---|
| 5,452,450 A | 9/1995 | Delory | |
| 5,933,837 A | 8/1999 | Kung | |
| 5,978,918 A | 11/1999 | Scholnick | |
| 6,850,918 B1 | 2/2005 | Burchetta et al. | |
| 6,954,741 B1 | 10/2005 | Burchetta et al. | |
| 7,395,243 B1 | 7/2008 | Zielke et al. | |
| 7,413,113 B1* | 8/2008 | Zhu ................. | G06Q 20/12 235/375 |
| 7,472,089 B2 | 12/2008 | Hu et al. | |
| 7,552,060 B2 | 6/2009 | Vest | |
| 8,180,713 B1 | 5/2012 | Rigby et al. | |
| 8,490,197 B2 | 7/2013 | Herz | |
| 8,600,895 B2 | 12/2013 | Felsher | |

(Continued)

FOREIGN PATENT DOCUMENTS

| | | |
|---|---|---|
| BR | 112013017973-2 | 10/2020 |
| EP | 2 410 484 | 1/2012 |

(Continued)

OTHER PUBLICATIONS

Al-Fedaghi et al., "Personal Information eWallet", 2006 IEEE International Conference on Systems, Man, and Cybernetics, Published Oct. 8-11, 2006, pp. 8.

(Continued)

*Primary Examiner* — Kirsten S Apple
(74) *Attorney, Agent, or Firm* — Knobbe, Martens, Olson & Bear, LLP

(57) ABSTRACT

A credit account extraction system is configured to identify account information in credit data associated with a consumer and populate a digital wallet of the consumer with the identified financial card information. The financial card information may then be used by online retailers, for example, to expedite transaction completion.

18 Claims, 10 Drawing Sheets

(56) References Cited

U.S. PATENT DOCUMENTS

| | | |
|---|---|---|
| 8,639,622 B1 | 1/2014 | Moore et al. |
| 8,712,789 B2 | 4/2014 | Stibel et al. |
| 8,712,907 B1 | 4/2014 | Stibel et al. |
| 8,713,651 B1 | 4/2014 | Stibel |
| 8,732,803 B2 | 5/2014 | Stibel et al. |
| 9,092,616 B2 | 7/2015 | Kumar et al. |
| 9,106,646 B1 | 8/2015 | Zheng |
| 9,111,281 B2 | 8/2015 | Stibel et al. |
| 9,286,162 B2 | 3/2016 | Obusek |
| 9,348,896 B2 | 5/2016 | Faith et al. |
| 9,652,802 B1 | 5/2017 | Kasower |
| 9,704,107 B1 | 7/2017 | Baker, IV et al. |
| 9,824,199 B2 | 11/2017 | Kshirsagar et al. |
| 10,013,423 B2 | 7/2018 | Faith et al. |
| 10,198,766 B1 | 2/2019 | Dharmadhikari et al. |
| 10,235,965 B2 | 3/2019 | Horneff et al. |
| 10,664,907 B2 | 5/2020 | Rieger |
| 10,783,576 B1 | 9/2020 | Van Os et al. |
| 10,798,113 B2 | 10/2020 | Muddu et al. |
| 10,839,446 B1 | 11/2020 | Mupkala et al. |
| 10,904,212 B1 | 1/2021 | Kaizer |
| 10,916,220 B2 | 2/2021 | Ngo |
| 11,308,551 B1 | 4/2022 | Mahacek et al. |
| 11,315,179 B1 | 4/2022 | Rehder et al. |
| 11,356,430 B1 | 6/2022 | Kapczynski et al. |
| 11,373,109 B2 | 6/2022 | Zoldi et al. |
| 11,379,916 B1 | 7/2022 | Taylor et al. |
| 11,399,029 B2 | 7/2022 | Manna et al. |
| 11,425,144 B2 | 8/2022 | Bondugula et al. |
| 11,436,626 B2 | 9/2022 | Lawrence et al. |
| 11,449,844 B1 | 9/2022 | Harris et al. |
| 11,461,364 B1 | 10/2022 | Charyk et al. |
| 11,489,834 B1 | 11/2022 | Carroll et al. |
| 11,514,519 B1 | 11/2022 | Hunt, III |
| 11,580,598 B1 | 2/2023 | Rehder et al. |
| 11,631,130 B1 | 4/2023 | Taylor et al. |
| 11,651,426 B1 | 5/2023 | Wasser et al. |
| 11,665,253 B1 | 5/2023 | Dean et al. |
| 11,769,112 B2 | 9/2023 | McMillan et al. |
| 11,769,200 B1 | 9/2023 | Kapczynski et al. |
| 11,790,112 B1 | 10/2023 | Burger et al. |
| 11,842,454 B1 | 12/2023 | Lin et al. |
| 11,863,310 B1 | 1/2024 | Kapczynski et al. |
| 11,924,213 B2 | 3/2024 | Felice-Steele et al. |
| 11,941,065 B1 | 3/2024 | Li et al. |
| 12,020,320 B1 | 6/2024 | Hunt, III |
| 12,020,322 B1 | 6/2024 | Wasser et al. |
| 12,067,617 B1 | 8/2024 | Taylor et al. |
| 12,074,876 B2 | 8/2024 | Felice-Steele et al. |
| 12,169,867 B1 | 12/2024 | Kapczynski et al. |
| 12,205,076 B2 | 1/2025 | McMillan et al. |
| 2002/0040312 A1 | 4/2002 | Dhar et al. |
| 2002/0062249 A1* | 5/2002 | Iannacci ............... G06Q 30/06 705/14.1 |
| 2002/0099679 A1 | 7/2002 | Usitalo |
| 2002/0169840 A1 | 11/2002 | Sheldon |
| 2003/0088472 A1 | 5/2003 | Offutt et al. |
| 2003/0225729 A1 | 12/2003 | Maloche et al. |
| 2003/0229585 A1 | 12/2003 | Butler |
| 2004/0249789 A1 | 12/2004 | Kapoor et al. |
| 2006/0010057 A1 | 1/2006 | Bradway et al. |
| 2006/0143095 A1 | 6/2006 | Sandus et al. |
| 2006/0206418 A1 | 9/2006 | Byrne et al. |
| 2006/0242204 A1 | 10/2006 | Karas et al. |
| 2006/0282897 A1 | 12/2006 | Sima |
| 2007/0022027 A1 | 1/2007 | Gupta et al. |
| 2007/0033393 A1 | 2/2007 | Ganesan et al. |
| 2007/0043661 A1 | 2/2007 | Kass et al. |
| 2007/0100783 A1 | 5/2007 | Cialini et al. |
| 2007/0179993 A1 | 8/2007 | Arruza |
| 2007/0198599 A1 | 8/2007 | Tobies |
| 2009/0069000 A1 | 3/2009 | Kindberg et al. |
| 2009/0132813 A1 | 5/2009 | Schibuk |
| 2010/0063877 A1 | 3/2010 | Soroca |
| 2010/0169313 A1 | 7/2010 | Kenedy |
| 2011/0047086 A1 | 2/2011 | Heisterkamp et al. |
| 2011/0153368 A1 | 6/2011 | Pierre et al. |
| 2011/0289094 A1 | 11/2011 | Fisher |
| 2011/0304646 A1 | 12/2011 | Kato |
| 2011/0314098 A1 | 12/2011 | Farrell |
| 2011/0320342 A1 | 12/2011 | Kremen |
| 2012/0036053 A1 | 2/2012 | Miller |
| 2012/0078766 A1 | 3/2012 | Rose et al. |
| 2012/0136835 A1 | 5/2012 | Kosuru et al. |
| 2012/0191595 A1 | 7/2012 | Evans |
| 2012/0215584 A1 | 8/2012 | Narsude et al. |
| 2012/0239583 A1 | 9/2012 | Dobrowolski |
| 2012/0246092 A1 | 9/2012 | Stibel et al. |
| 2012/0246093 A1 | 9/2012 | Stibel et al. |
| 2012/0278249 A1 | 11/2012 | Duggal et al. |
| 2012/0290486 A1 | 11/2012 | Dobrowolski et al. |
| 2012/0290712 A1 | 11/2012 | Walter |
| 2012/0296741 A1 | 11/2012 | Dykes |
| 2012/0296804 A1 | 11/2012 | Stibel et al. |
| 2012/0323695 A1 | 12/2012 | Stibel |
| 2013/0013553 A1 | 1/2013 | Stibel et al. |
| 2013/0031105 A1 | 1/2013 | Stibel et al. |
| 2013/0085939 A1 | 4/2013 | Colak et al. |
| 2013/0212646 A1 | 8/2013 | McFarland |
| 2013/0232018 A1 | 9/2013 | Keithley et al. |
| 2013/0238387 A1 | 9/2013 | Stibel et al. |
| 2013/0282657 A1 | 10/2013 | Besen et al. |
| 2013/0332189 A1 | 12/2013 | Manning |
| 2013/0332340 A1 | 12/2013 | Papadimitriou |
| 2013/0339141 A1 | 12/2013 | Stibel et al. |
| 2014/0015860 A1 | 1/2014 | Kim et al. |
| 2014/0025562 A1 | 1/2014 | Rothrock et al. |
| 2014/0040197 A1 | 2/2014 | Wijayaratne et al. |
| 2014/0089619 A1 | 3/2014 | Khanna et al. |
| 2014/0095640 A1 | 4/2014 | Stibel et al. |
| 2014/0114735 A1 | 4/2014 | Isaacson et al. |
| 2014/0122354 A1 | 5/2014 | Stibel et al. |
| 2014/0173732 A1 | 6/2014 | Stibel |
| 2014/0181027 A1 | 6/2014 | Whitehead |
| 2014/0365354 A1 | 12/2014 | Shvarts |
| 2015/0127527 A1 | 5/2015 | Eide |
| 2015/0142639 A1 | 5/2015 | Padawer |
| 2015/0161228 A1 | 6/2015 | Davies |
| 2015/0207789 A1 | 7/2015 | Kumar |
| 2015/0235562 A1 | 8/2015 | Klein |
| 2015/0262249 A1 | 9/2015 | Wical |
| 2015/0278277 A1 | 10/2015 | Agrawal et al. |
| 2015/0379528 A1 | 12/2015 | Gupta et al. |
| 2016/0070758 A1 | 3/2016 | Thomson et al. |
| 2016/0078493 A1 | 3/2016 | Liberty |
| 2016/0232546 A1 | 8/2016 | Ranft |
| 2017/0061409 A1 | 3/2017 | Morecki |
| 2017/0070500 A1 | 3/2017 | Hockey et al. |
| 2017/0131964 A1 | 5/2017 | Baek et al. |
| 2017/0255964 A1 | 9/2017 | Hendricks |
| 2017/0255994 A1 | 9/2017 | Rieger |
| 2017/0359346 A1 | 12/2017 | Parab et al. |
| 2018/0089935 A1 | 3/2018 | Froy, Jr. |
| 2018/0097828 A1 | 4/2018 | Coskun |
| 2018/0101994 A1 | 4/2018 | Da Veiga et al. |
| 2018/0129325 A1 | 5/2018 | Shreve |
| 2018/0196922 A1 | 7/2018 | Abuelsaad |
| 2018/0285981 A1 | 10/2018 | Andringa et al. |
| 2019/0102438 A1 | 4/2019 | Murray et al. |
| 2019/0147366 A1 | 5/2019 | Sankaran et al. |
| 2019/0197528 A1 | 6/2019 | Dean et al. |
| 2020/0013053 A1 | 1/2020 | Amin |
| 2020/0120004 A1 | 4/2020 | Kohout et al. |
| 2020/0126126 A1 | 4/2020 | Briancon et al. |
| 2020/0137110 A1 | 4/2020 | Tyler et al. |
| 2020/0210466 A1 | 7/2020 | Yin et al. |
| 2021/0027357 A1 | 1/2021 | Bonfigli et al. |
| 2021/0152567 A1 | 5/2021 | Huston, III et al. |
| 2021/0272206 A1 | 9/2021 | O'Brien et al. |
| 2022/0374744 A1 | 11/2022 | Zoldi et al. |
| 2023/0007007 A1 | 1/2023 | Manna |
| 2023/0054085 A1 | 2/2023 | Bondugula et al. |

(56) References Cited

U.S. PATENT DOCUMENTS

| | | |
|---|---|---|
| 2023/0267496 A1 | 8/2023 | Lawrence et al. |
| 2024/0046318 A1 | 2/2024 | Muriqi |
| 2025/0030695 A1 | 1/2025 | Felice-Steele et al. |

FOREIGN PATENT DOCUMENTS

| | | |
|---|---|---|
| WO | WO 02/091127 | 11/2002 |
| WO | WO 2009/039380 | 3/2009 |
| WO | WO 2012/054401 | 4/2012 |
| WO | WO 2013/030260 | 3/2013 |

OTHER PUBLICATIONS

Borowitz, Mariel, "Open Space: The Global Effort for Open Access to Environmental Satellite Data", The MIT Press, Chapter 4:Ideas and Technology, 2017, pp. 28.

Cai et al., "A Genetic Algorithm Model for Personal Credit Scoring", Dec. 2009, IEEE, pp. 4.

Caldeiira et al., "Characterizing and Preventing Chargebacks in Next Generation Web Payments Services", 2012 Fourth International Conference on Computational Aspects of Social Networks (CASoN), 2012 IEEE, pp. 333-338.

Chen et al.., "Trends and Technology in E-Payment", Competition Forum, American Society for Competitiveness, 20019, vol. 17, No. 2, pp. 402-412.

Christianson, David, "Monitoring Your Credit's Health", Winnipeg Free Press [Online], Jan. 7, 2011, pp. 2.

"Discover Card Brings Out Credit ScoreTracker", Wireless News, Nov. 24, 2007, pp. 2.

European Network and Information Security Agency (enisa): Privacy and Security Risks when Authenticating on the Internet with European eID Cards, Nov. 2009, pp. 1-41.

Federal Bureau of Investigation (FBI): The Cyber Threat to the Financial Sector: Testimony, Sep. 14, 2011, pp. 1-6.

Gustafsson et al., "Always Best Connected", 3G Mobile Network Technologies and Experiences, IEEE Wireless Communications, Feb. 28, 2003, vol. 10, No. 1, pp. 49-55.

Li, Jingquan, "Data Protection in Healthcare Social Networks", IEEE Software I published by the IEEE computer society, 2017, pp. 8.

Peng et al., "Factors Affecting Online Purchase Behavior: Implications to Improve the Existing Credit Rating System", 2009 International Conference on Management and Service Science, 2009 IEEE, pp. 1-4.

Vantage Score, "Assume the Role of Managing Your Credit Prudently and Watch Your Credit Score Improve", VantageScore.com, Jul. 2012, pp. 12.

"What is an API? How APIs work, simply explained". Contentful, Jul. 25, 2023, pp. 17.

Yao, Ping, "Feature Selection Based on SVM for Credit Scoring", 2009 International Conference on Computational Intelligence and Natural Computing, 2009, pp. 44-47.

\* cited by examiner http://www.officeworld.tld

Complete Your Purchase

1  B5 Notebook   3.82
2  Jet Black Pens  4.12
3  3x Toners     47.00

SUB TOTAL:  148.94
TAX :    9.00

TOTAL:   $157.94

Select Payment Source

Login to Wallet    Login: _____
                   Password: _____
○ Wallet Service A
◉ Wallet Service B      [Submit to Retrieve Credit Card Options]
○ Payment Service C     [Manually Enter Credit Card Info.]

CREDIT CARD ACCOUNT DATA EXTRACTION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation of U.S. application Ser. No. 16/289,110, filed Feb. 28, 2019, which is a continuation of U.S. application Ser. No. 13/706,996, titled "CREDIT CARD ACCOUNT DATA EXTRACTION", filed on Dec. 6, 2012, the entire contents of which are each incorporated herein by reference.

BACKGROUND

Consumers often use credit cards for online and off-line transactions and increasingly have more credit card options available.

SUMMARY

Credit card account data of consumers is typically included in credit data of the consumers, as reported by respective lenders with which the consumers have had or currently have relationships. Thus, the credit data of a consumer is a good source for obtaining credit card account data regarding the consumer from a single source.

Disclosed herein are systems and methods for extracting credit card account data from credit data of a consumer and using the extracted credit card account data in various novel manners. For example, in one embodiment credit card account data may be accessed during a checkout process at an online retailer in order to provide the consumer with options for selecting a credit card to be used in the transaction, while also removing the need for the consumer to manually provide credit card information for the transaction.

Extracted credit card account data may be stored in a digital wallet that may be managed by the consumer, wherein the consumer can provide entities (e.g., online retailers) access to the online wallet in order to obtain credit card account data from the consumer. The digital wallet may, in turn, keep the credit card account data in the digital wallet updated by periodically accessing the consumer's credit data (e.g., from one or more credit bureaus) and extracting credit card account data from the consumers credit data.

BRIEF DESCRIPTION OF THE DRAWINGS

FIG. 6 illustrates an example user interface that might be provided to a user as part of a checkout process wherein the user can select a wallet service from which the retailer can obtain credit card account data for the consumer.

DETAILED DESCRIPTION

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Example System Configurations

Figure 1:
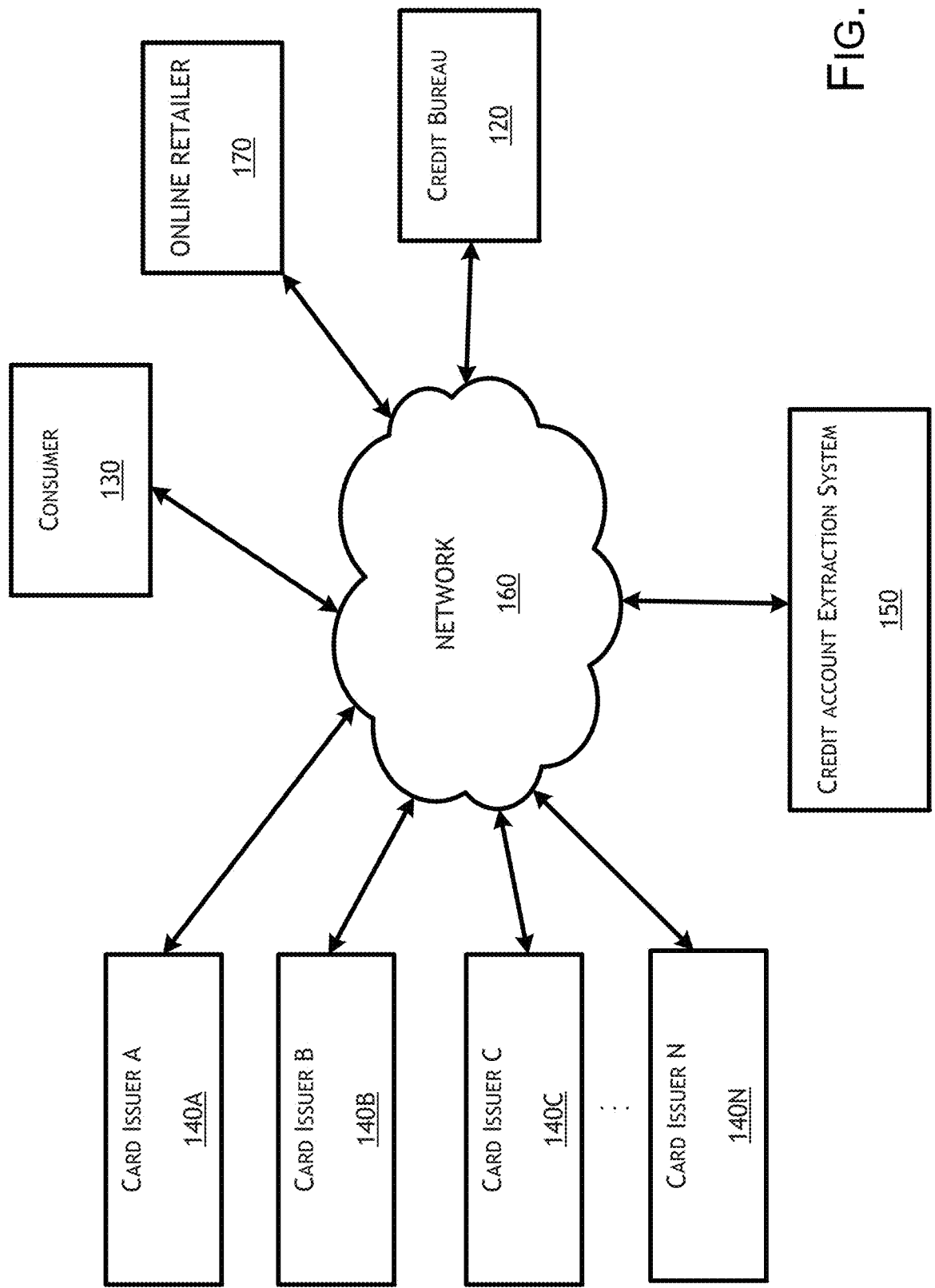
FIG. 1 is a block diagram illustrating one embodiment of a credit account extraction system in communication with a credit bureau, a consumer, and one or more financial card issuers.

FIG. 1 is a block diagram illustrating one embodiment of a credit account extraction system 150 in communication with a credit bureau 120, a consumer 130, and one or more financial card issuers 140 (including card issuer 140A, card issuer 140B, card issuer 140C, and card issuer 140N). In one embodiment, the system outlined in FIG. 1A is computerized, wherein each of the illustrated components comprises one or more computing devices that are configured to communicate with other computer devices via a network 160. For example, the consumer 130 may comprise a computing device, such as a desktop, notebook, or handheld computing device that is configured to transmit and receive data to/from other computing devices via the network 160. Similarly, each of the card issuers 140, the credit bureau 120, and the credit account extraction system 150, may include one or more computing devices that are configured to communicate data with other computing devices via the network 160.

Depending on embodiment, the network 160 may comprise one or more of any type of network, such as one or more local area networks, wide area networks, personal area networks, telephone network, and/or the Internet, which may be accessed via any available wired and/or wireless communication protocols. Thus, the network 160 of FIG. 1A may comprise a secure LAN through which the credit account extraction system 150 and the credit bureau 120 communicate, and the network 160 may further comprise an Internet connection through which the credit account extraction system 150 and the consumer 130 communicate. In another embodiment the network 160 comprises one or more telephone networks, whether wireless or wired, that carries voice communications between the consumer 130 and a representative of the credit account extraction system 150, for example. Any other combination of networks, including secured and unsecured network communication links, are contemplated for use in the systems described herein.

In the embodiment of FIG. 1, the card issuers 140 provide credit card account data regarding customers of the respective card issuers to the credit bureau 120. The credit Bureau 120 may then provide credit data regarding consumers to entities that have a permissible purpose for obtaining that information, such as authorization from the consumer. Thus, in one embodiment the credit account extraction system 150 obtains authorization from a consumer to access credit data of the consumer and, thereafter, obtains credit data of the consumer from the credit bureau 120. The credit account extraction system 150 may then extract credit card account data from the credit data and provide the credit card account data to entities, as authorized by the consumer 130, such as the online retailer 170.

Figure 2:
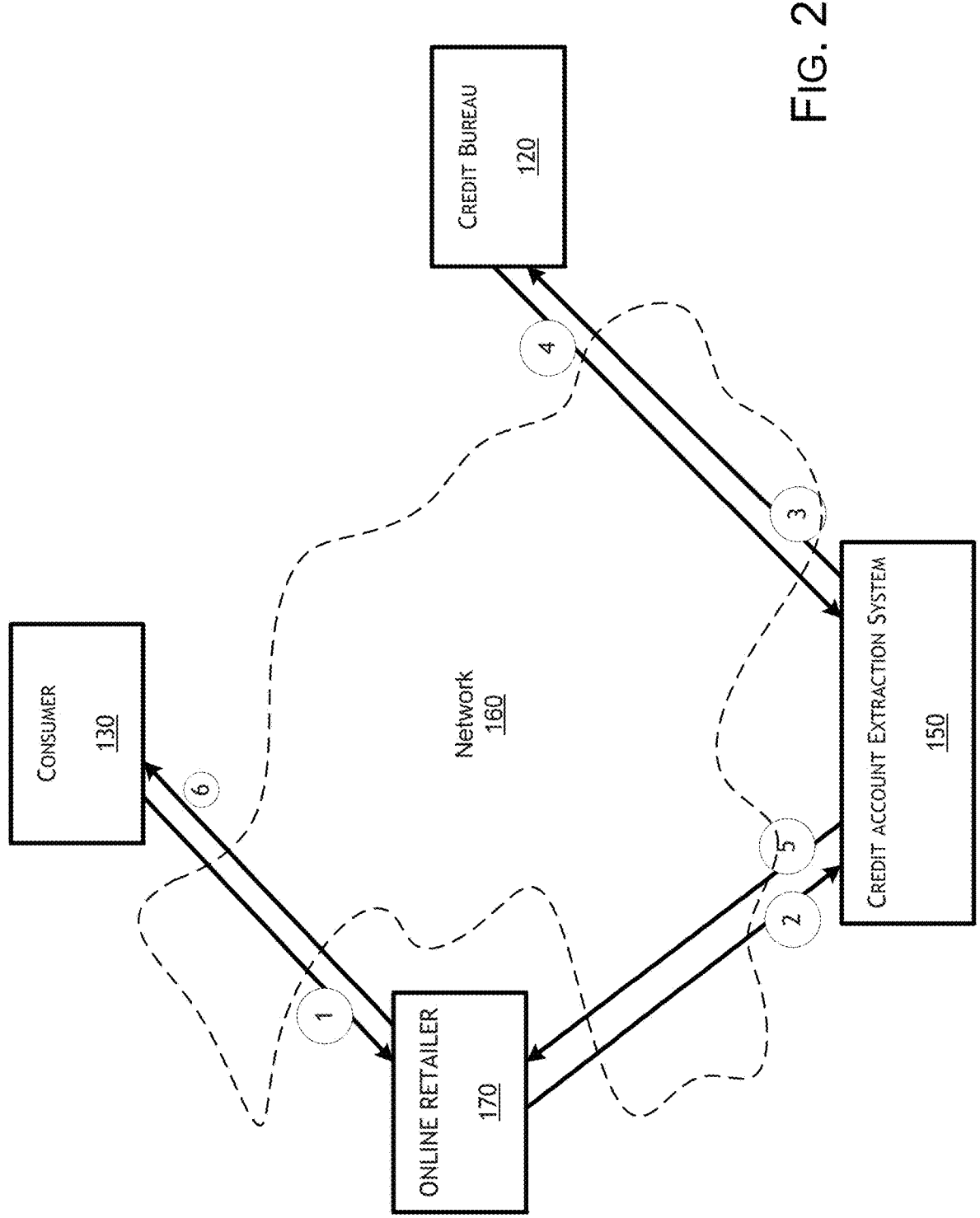
FIG. 2 is a block diagram illustrating a consumer in communication with an online retailer, wherein the online retailer obtains credit card account data of the consumer from the credit account extraction system, which in turn, obtains the consumers credit card account data from one or more credit bureaus.

FIG. 2 is a block diagram illustrating another embodiment of the credit account extraction system 150, the credit bureau 120, the consumer 130, and the online retailer 170 of FIG. 1, where an exemplary temporal flow of data is outlined. In particular, the circled numerals of FIG. 2 illustrate a sample order in which data may flow between the various components of FIG. 2 according to one embodiment. In other embodiments, the steps outlined by the circled numerals may be performed in a different order, and the method may include fewer or additional steps.

In step one of FIG. 2, the consumer communicates with the online retailer 170, such as to select one or more products or services to purchase from the online retailer 170. The consumer may then provide the online retailer with authorization to access the consumer's credit data in order to provide credit card options to the consumer 130. More particularly, the consumer 130 may authorize the online retailer 170 to contact the credit account extraction system 150 (step 2) in order to receive credit card account data associated with the consumer directly from the credit bureau 120 (step 3).

In step 4, the credit bureau 120 provides credit data of the consumer to the credit account extraction system and the credit account extraction system 150 parses, extracts, and/or otherwise analyzes the credit data in order to determine credit card accounts associated with the consumer.

Next, in step 5, the credit card account data is provided to the online retailer 170. In some embodiments, the credit card account data that is provided to the online retailer 170 is limited, such as based on rules that are established by the consumer 130. For example, the consumer 130 may only authorize certain types and/or quantities of credit accounts to be provided to the online retailer 170.

Finally, in step 6, the online retailer provides the credit card account data from the credit account extraction system 150 to the consumer 130, such as to allow the consumer 130 to select one of the credit card accounts for use in a purchase transaction. In some embodiments, the consumer 130 may have rules established for automatic selection of a particular credit card of multiple credit cards of the consumer 130 by the credit account extraction system 150, such that a request by the online retailer 170 (e.g., step 2) results in return of only credit card account data for only a single credit card of the consumer (e.g., step 5). For example, the credit account extraction system 150 may select a credit card of multiple credit cards of the consumer 130 that has a highest available balance, a lowest credit utilization, a preferred rewards program for the particular online retailer 170, and/or other attributes associated with the transaction.

Figure 3:
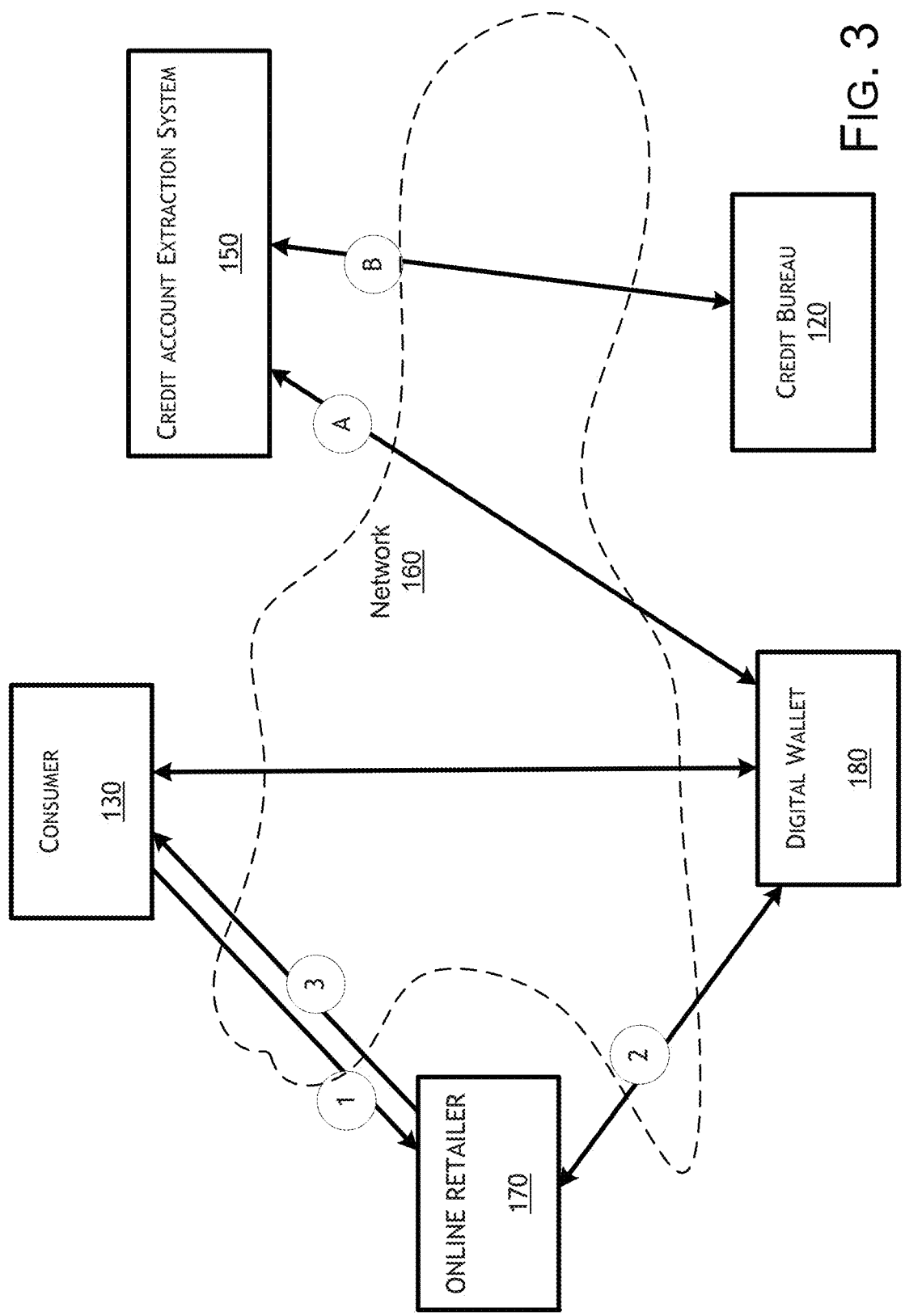
FIG. 3 is a block diagram illustrating a consumer in communication with a digital wallet that is configured to obtain credit card account data of the consumer. The digital wallet may receive credit card account data from the credit account extraction system and the online retailer may obtain the consumers credit card account data directly from the digital wallet.

FIG. 3 is a block diagram illustrating a system configuration wherein a consumer establishes and manages a digital wallet 180 including credit card account data of the consumer. The digital wallet 180 may receive credit card account data from the credit account extraction system 150 and the online retailer 170 may obtain the consumers credit card account data directly from the digital wallet 180.

FIG. 3 illustrates two general processes: one process involves steps A and B, which are generally a backend process whereby the digital wallet 180 periodically obtains updated credit card account information from the credit account extraction system 150, and a realtime process comprising steps 1-3 wherein the online retailer 170 accesses credit card account data of the consumer 130 directly from the digital wallet 180 account of the consumer 130. In other embodiments, these processes may be performed in a different order than is illustrated and may include fewer or additional steps.

In general, the digital wallet 180 is a repository for account information associated with the consumer 130 (as well as a plurality of other consumers). In some embodiments, the consumer can set rules for what account information is stored in a digital wallet account of the consumer as well as what portions of the information may be shared with other entities and/or what entities the information may be shared with. As shown in the diagram of FIG. 3, the consumer 130 corresponds with the digital wallet 180 in order to enroll in a digital wallet account and provide identification information to the digital wallet 180. In one embodiment, the identification information is any information that is sufficient to authorize the digital wallet 180 (or an agent thereof) to access credit data of the consumer. For example, in one embodiment the consumer 130 may provide the digital wallet 180 with the consumer's full name, street address, and an authorization to access credit data of the consumer 130. In other embodiments, less or additional information regarding the consumer may be provided to the digital wallet 180.

Step A illustrates communication between the digital wallet 180 and the credit account extraction system 150, whereby the digital wallet 180 may request credit information of the consumer 130 and the credit account extraction system 150 returns the requested data. Step B illustrates communication between the credit account extraction system 150 and one or more credit bureaus 120, whereby the credit account extraction system 150 accesses (e.g., periodically, such as weekly, monthly or quarterly) credit data of the consumer from the credit bureau 120. In some embodiments, the authorization provided to the digital wallet by the consumer 130 is passed through the credit account extraction system 150 to the credit bureau 120 in order to authorize the credit account extraction system 150 to obtain credit data of the consumer from the credit Bureau 120.

With a credit card account wallet established, the consumer may then allow other entities to access the credit card account data stored by the digital wallet 180 for various purposes, such as to provide credit card information to complete a purchase. Steps 1 through 3 illustrate one such process that may be optimized through communication with the digital wallet 180.

In step 1, the consumer 130 communicates with the online retailer 170, such as regarding a monetary transaction. In step 2, the online retailer 170 requests credit card account data of the consumer 130 from the digital wallet 180. In this embodiment, because the consumer had previously provided authorization to the digital wallet 180 to access credit data of the consumer, such authorization may not be provided to the online retailer 170. For example, the online retailer 170 may receive credit card information stored by the digital wallet 180, which was previously retrieved from the credit account extraction system 150 and the credit bureau 120 in view of authorization provided by the consumer 130 previously. In this embodiment, the digital wallet 180 returns credit card account data to the online retailer 170. As noted above, the credit card account information may include information regarding all, some, or only one of the credit card accounts of the consumer that are stored at the digital wallet 180, such as based on rules and/or preferences that are established by the consumer 130.

Example Credit Pull Authorization

Figure 4A:
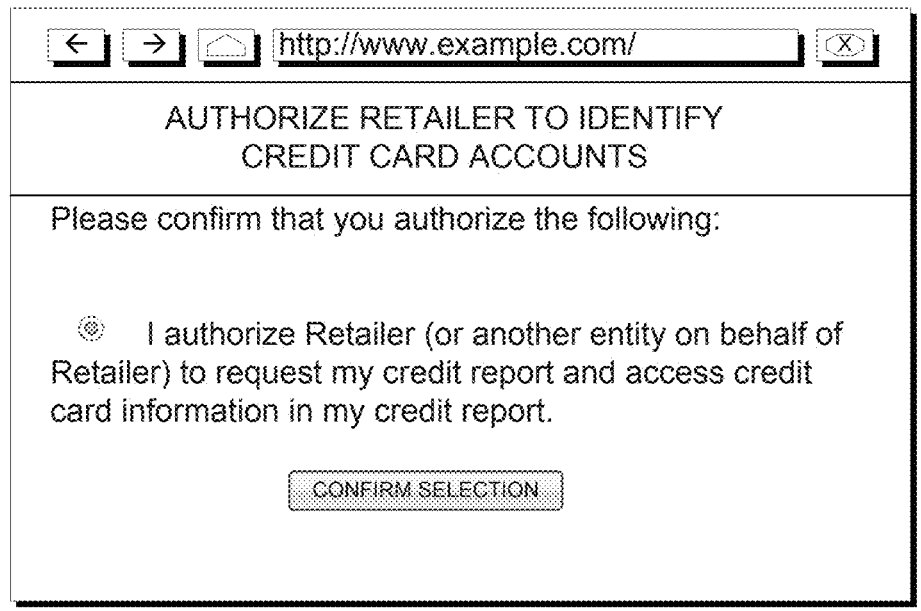
FIGS. 4A and 4B are example user interfaces that may be provided to users in order to obtain authorization to retrieve credit data of the consumer.
Figure 4B:
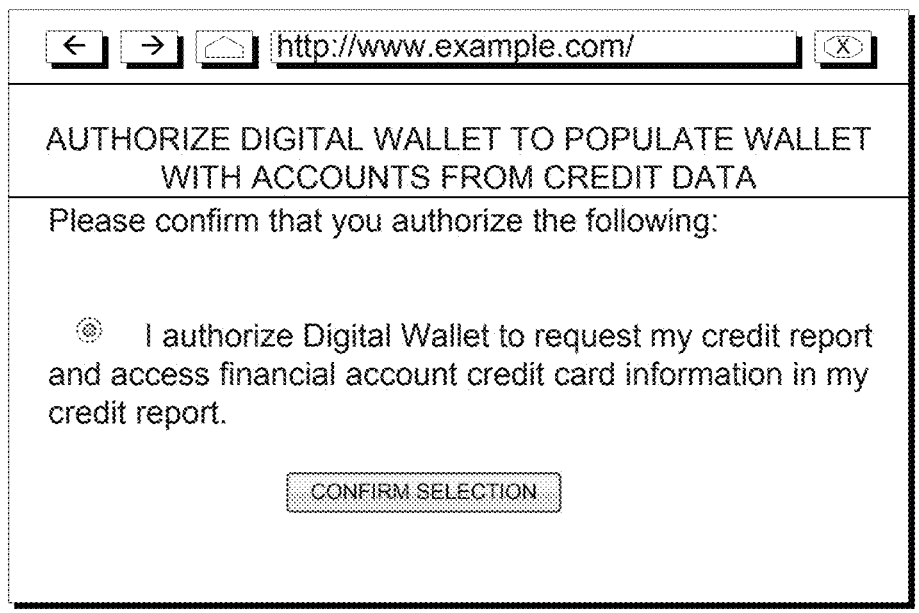

FIGS. 4A and 4B are example user interfaces that may be provided to users in order to obtain authorization to retrieve credit data of the consumer. In the example of FIG. 4A, the consumer authorizes a retailer, or other entity on behalf of the retailer, to request the consumer's credit report and access credit card information in the consumer's credit report. Such an authorization may be used in a system such as that illustrated in FIG. 2, wherein the retailer contacts the credit account extraction system 150 in order to retrieve credit card account data in realtime as a transaction is about to close.

In the example of FIG. 4B, the consumer authorizes the digital wallet 180 to request credit data of the consumer, possibly on a periodic basis. Such an authorization may be used in a system such as that illustrated in FIG. 3, wherein an account is initially established with the digital wallet 180 and the digital wallet 180 is authorized to access the consumer's credit data once, a limited number times, or indefinitely on a periodic basis.

Example Retailer User Interfaces With Credit Account Data

Figure 5A:
FIG. 5A illustrates an example user interface that might be provided to a consumer as part of a checkout process, wherein credit card account data is provided to the consumer so that the consumer can easily select a credit card for payment of the purchase.

FIG. 5A illustrates an example user interface that might be provided to a consumer as part of a checkout process, wherein credit card account data is provided to the consumer so that the consumer can easily select a credit card for payment of the purchase. In the example of FIG. 5A, the consumer has selected three items for purchase and has advanced to a user interface wherein the consumer can complete purchase of the items. As part of the order completion process, the consumer provides credit card account data. Rather than manually providing credit card account data (e.g., typing in the credit card number, expiration date, name on card, CVV, etc.), in the embodiment illustrated in FIG. 5A, the retailer accesses either a digital wallet 180 or the credit account extraction system 150 directly in order to obtain credit card account data of the consumer. In the embodiment of FIG. 5A, credit card account data from either of those sources is displayed to the consumer and the consumer is allowed to select one of the credit cards for use in completing the transaction. In the embodiment of FIG. 5A, the credit card accounts displayed are a Gold Visa, Traveler's Visa, Discover, and Blue AMEX credit cards, and the consumer has placed a cursor over the blue AMEX credit card (or touched the text associated with the Blue AMEX card in a touchscreen embodiment), and may select the Blue AMEX credit card for use in completing the purchase by clicking on the information associated with that credit card.

In some embodiments, all of the information regarding the credit card account that is necessary to complete the transaction is provided by the digital wallet 180 (although all the information may not be displayed to the consumer) and/or credit account extraction system 150 so that the retailer does not need to request any additional information from the consumer in order to complete the transaction. For example, the expiration date, security code, name on card, issuer, address associated with the card, etc., may be included in the credit card account data provided by the credit account extraction system 150.

Figure 5B:
FIG. 5B illustrates another user interface displaying multiple credit cards that may be selectable by a user in order to use the selected credit card for a purchase or other transaction. In this embodiment, credit utilization is illustrated next to respective credit cards and the credit cards may be ordered based on one or more factors.

FIG. 5B illustrates another user interface displaying multiple credit cards that may be selectable by a consumer in order to use the selected credit card for a purchase or other transaction. Depending on the embodiment, the information provided to the consumer as part of the list of credit cards displayed may include various information. The information included may be determined by the particular retailer that displays the credit card account data, by the digital wallet 180, and/or credit account extraction system 150.

In the embodiment of FIG. 5B, credit utilization is illustrated next to respective credit cards and the credit cards may be ordered based on one or more factors. For example, the credit utilization of the Gold Visa card is indicated as good and the bar chart indicates that utilization of that card's available balance is around 15%. However, the utilization of the Blue AMEX card is indicated as bad and the corresponding bar chart indicates that the utilization of that card's available balance is around 90%. Furthermore, the utilization of the Traveler's Visa and the Discover card are both indicated as OK and have utilizations of around 60% to 70%. Depending on the embodiment, the thresholds for good, ok, bad, and/or any other categorizations that may be desired, may be determined by the credit account extraction system 150, the digital wallet 180, and/or the consumer 130. For example, in one embodiment the credit account extraction system 150 sets the threshold for "bad" credit utilization for a particular credit card based on a level that would negatively impact the consumer's credit score.

In other embodiments, available credit, credit limit, custom rewards, etc. may be displayed next to the card in order to aid the consumer in selecting the appropriate card for the given transaction. Furthermore, the order of display of the cards in such a user interface may be based on one or more of the above noted attributes, and/or any other attributes associated with the transaction. In the embodiment of FIG. 5B, the cards are sorted so that the card with the best (e.g., lowest) credit utilization is first and the card with the worst (e.g., highest) credit utilization is listed last. In other embodiments, the sorting may be based on a combination of these attributes, such as a combination of credit utilization and available credit limit. In one embodiment, any impact on the consumers credit score for using respective credit cards for the transaction may be displayed also. Thus, the amount of the transaction may be used in determining whether adding the transaction to a particular credit card balance would move the card into a utilization category that may negatively impact the user's credit score.

FIG. 6 illustrates an example user interface that might be provided to a user as part of a checkout process wherein the user can select a wallet service from which the retailer can obtain credit card account data for the consumer. In the example of FIG. 6, the user is provided with 2 wallet services (e.g., digital wallet 180) and a payment service (e.g. commonly used wallet and/or payment services) to choose from in order to provide credit card account data to the retailer associated with the purchase transaction. In some embodiments, the consumer is able to select additional wallet services and/or payment services.

In this embodiment, the consumer selects a wallet service (e.g., with which the consumer has an already established account) and provides a login and password to the selected wallet service so that the retailer can retrieve the credit card account data from the wallet service on behalf of the consumer. In some embodiments, the login and password information is provided directly to the retailer, which passes the information to the selected digital wallet, while in other embodiments the consumer is provided with a separate login screen for the digital wallet (e.g., outside of the retailer's website) and after login to the digital wallet, the digital wallet separately provides the credit card account data to the retailer. In either case, the retailer is provided with credit card account data that may be used to allow the consumer to select one of multiple cards to use for the purchase or may allow completion of the purchase with a card that is automatically selected by the account wallet, such as in accordance with preferences established by the consumer (e.g., the consumer may have a rule indicating that the card with the lowest utilization at the time of a particular transaction is selected for use, or a rule indicating that the card with the lowest utilization after the transaction is added to the account balance is automatically selected for use in the transaction).

Figure 7:
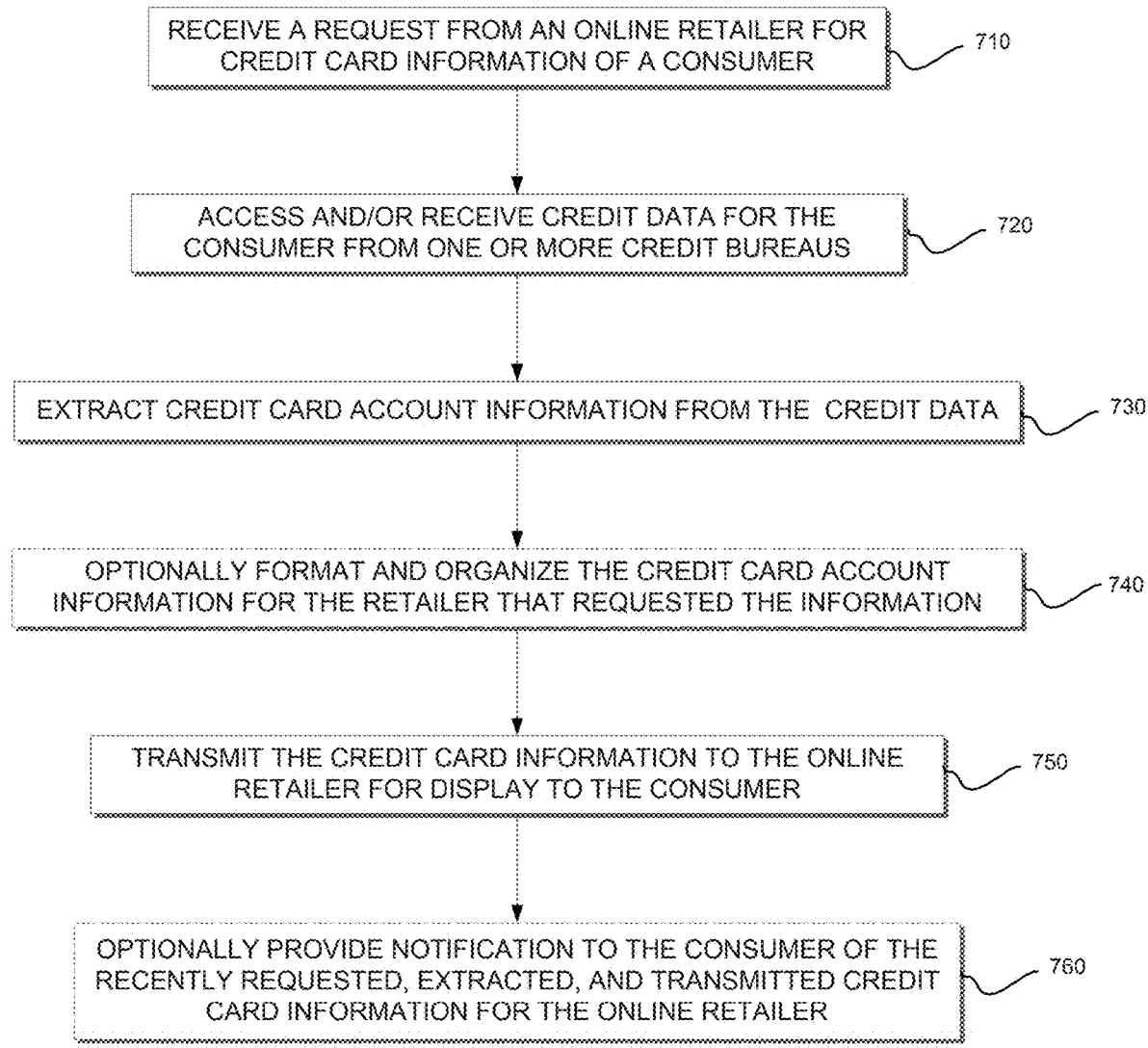
FIG. 7 is a flowchart illustrating one embodiment of a method that may be performed in order to extract credit card account data from a consumer's credit data and use the extracting credit card account data as part of a monetary transaction.

FIG. 7 is a flowchart illustrating one embodiment of a method that may be performed in order to extract credit card account data from a consumer's credit data and use the extracted credit card account data as part of a monetary transaction. In one embodiment, the method of FIG. 7 is performed by the credit account extraction system. However in other embodiments, the method may be performed by the digital wallet 180 and/or the credit account extraction system 150, and/or any other suitable computer systems. In some embodiments, the digital wallet 180 and the credit account extraction system 150 are a single system, such as controlled by a single entity. Depending on the embodiment, the method of FIG. 7 may include fewer or additional blocks and/or the blocks may be performed in order different than is illustrated.

Beginning at block 710, a request for credit card information of a consumer is received, such as the credit account extraction system 150 for the digital wallet 180. The request may be accompanied with authorization from the consumer to access credit data of the consumer in order to obtain credit card account data from the credit bureau. Alternatively, where the request is received by the digital wallet 170 (which the user has already authorized to obtain credit data of the consumer), such authorization from the consumer may not be included in the request.

Next, at block 720, credit data for the consumer at one or more credit bureaus is accessed. As discussed above, such a request for credit data may occur in real time as the consumer is communicating with the online retailer and/or may have occurred previously, such as by the digital wallet 180 as part of the consumer's initial enrollment in the digital wallet 180 service and/or a periodic update of credit card account data by the digital wallet 180.

Moving to block 730, credit card account data is extracted from the credit data. For example, the credit account extraction system 150 may be configured to determine one or more credit card accounts (and their associated information) from the consumer's credit data. Block 730 may be performed and in realtime as the consumers communicating with the online retailer 170 and/or may have occurred previously such as part of the establishment and/or update of credit card account data in the consumers digital wallet 180.

Next, in block 740 the credit card account data is optionally formatted and/or organize before it is provided to the online retailer 170. For example, multiple credit card accounts may be sorted based on one or more attributes of the credit card accounts, the retailer, the particular transaction, the consumer, and the like. For example, the credit card accounts may be sorted based on available balance or credit utilization (either before or after the transaction). Additionally, the credit card account data may be formatted in a universal format that is usable by multiple online retailers (and/or other participating entities) or may be in a format that is unique/proprietary to the particular online retailer.

In block 750, the credit card information is transmitted to the online retailer for display to the consumer.

In block 760, the consumer 130 is optionally provided with a notification of the requested, extracted, and/or transmitted credit card information for the online retailer 170. For example, the consumer 130 may be provided an email, text message, or other notification indicating that the consumer's credit card information was provided to the online retailer 170. Such indications may be useful for fraud prevention and/or record-keeping by the consumer 130.

Figure 8A:
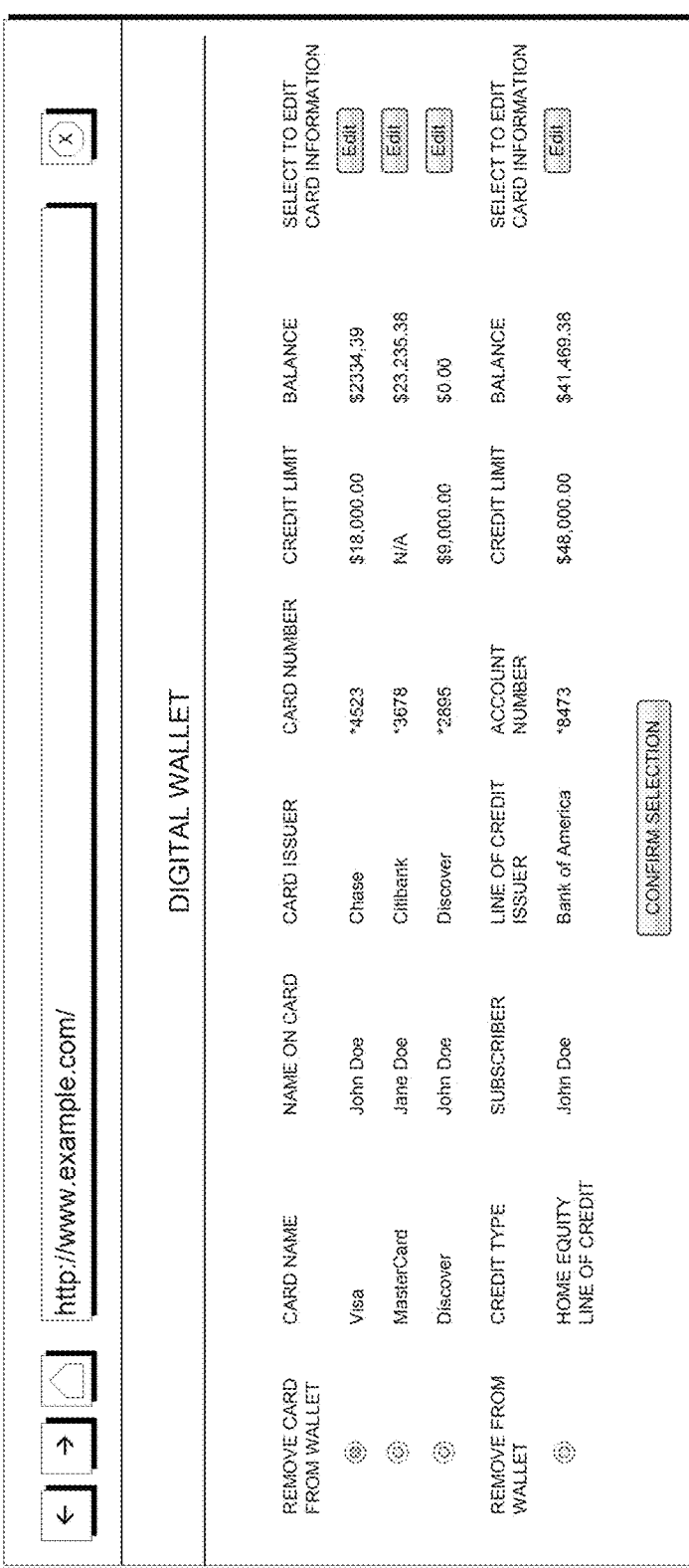
FIG. 8A is an example user interface that may be used by a consumer to manage credit card accounts stored by a digital wallet.
Figure 8B:
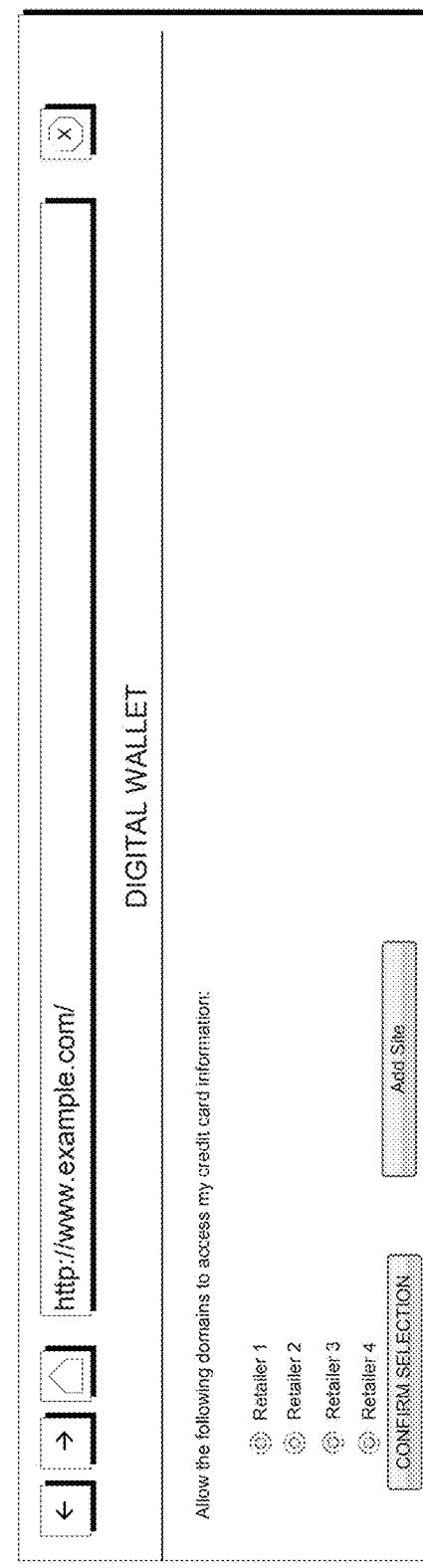
FIG. 8B is an example user interface that may be used by the consumer to determine access rights to credit card account data in the consumer's digital wallet by various entities, such as retailers or groups of retailers.

FIG. 8A is an example user interface that may be used by a consumer to manage credit card accounts stored by a digital wallet. In one embodiment, the credit card account data illustrated in FIG. 8A is entirely extracted from the consumer's credit data, such that the consumer is not required to manually enter any of the credit card information. This may be performed by the credit account extraction system 150 at the request of a particular retail website (or any other entity that requests the consumer's credit card information) or at the request of the digital wallet 180. In the embodiment of FIG. 8A, in addition to credit card accounts, a home equity line of credit account is also illustrated. Although many embodiments discussed herein are with reference to credit card accounts, other types of accounts may also be included. Thus, any reference herein to credit card accounts should be construed to include any other types of accounts, such as home equity accounts, mortgage accounts, store accounts, auto loans, student loans, installment loans, lines of credit, etc. Advantageously, information regarding many different types of credit accounts may be extracted from credit data of the consumer by the credit account extraction system 150, and included in a user interface such as is illustrated in FIGS. 8A and 8B.

In the embodiment of FIG. 8A, the consumer is provided with options to remove listed credit card accounts from the user's account by selecting "Remove Card From Wallet" user interface controls to the left of respective credit accounts. Additionally, the user is provided with an option to edit credit card account data using the "Edit" buttons to the right of respective accounts. For example, a user can update information based on transactions that may not yet be reflected in the data provided by the digital wallet 180. Such user-provided data may be updated the next time the digital wallet 180 requests credit data from the credit account extraction system 150, possibly after confirming with the consumer that the information should be updated.

In one embodiment, the consumer is also provided with a user interface to add additional accounts to the digital wallet 180, such as those that are not included in the consumer's credit data. For example, a credit account of a spouse or friend that is not included in the consumer's credit data may be manually added. Alternatively, in some embodiments the digital wallet 180 is configured to combine credit accounts extracted from multiple consumer's credit data (e.g., spouses) in order to provide a more comprehensive list of credit accounts for a group of individuals.

In addition to, or as an alternative to, information illustrated in FIG. 8A, the digital wallet may also have demographic information of the consumer as provided for each of the credit accounts (e.g., name, address, phone number, zip on file with respective credit issuers of the listed credit accounts), as well as the CVV (secret code on the back of the credit card) for respective credit accounts, and/or any other information related to the credit accounts. Any other information associated with the credit accounts may also be stored by the digital wallet 180. In some embodiments, the digital wallet 180 obtains additional information on the credit accounts from other sources. Similarly, the digital wallet 180 may obtain debit account information from other sources such that the digital wallet includes information regarding not only credit accounts, but also debit accounts that may be selectable by the consumer in order to complete purchases.

In one embodiment, the consumer is provided an option to refresh the credit card account data in the wallet 180 in order to provide updated balance and credit limit information, for example. Such an update may be requested via a user interface control (e.g., a button labeled "refresh data)" or any other means. In one embodiment, the user provides an updated authorization for the digital wallet 180 to request credit data of the consumer (e.g., via the credit account extraction system 150, which may be a separate system or a system that is operated by the same entity as the digital wallet 180).

As discussed above, depending on the embodiment the credit card account data may be sorted or ordered in different manners. For example, the consumer may be able to select (or the system may define as a default) priorities for ordering of the credit accounts, such as based on an impact on the consumer's credit score that a particular transaction would have. For example, a first listed credit account may result in the least impact to the consumer's credit score if that credit account is selected for a particular transaction (e.g., the transaction for which the credit card account data was requested by a retailer). Thus, the consumer could reduce any impact to the consumers credit score through selecting the highest prioritized card using these criteria. In one embodiment, the digital wallet 180 includes and/or is in communication with a score simulation system that is configured to simulate credit scores based on an actual credit score of the consumer and one or more adjustments to attributes that are included in calculation of the credit score.

In some embodiments the cards may be prioritized based on remaining credit available on cards, credit utilization (e.g. current or after the particular transaction has been factored into the respective cards), and/or any other factors. As noted above, in some embodiments the digital wallet 180 is configured to provide multiple credit accounts to the requesting entity (e.g., an online retailer), possibly sorted and/or prioritized in one of the matters discussed above. In other embodiments, the digital wallet 180 provides credit card account data regarding only a single credit account, such as a highest prioritized credit account so that the requesting entity (e.g., online retailer) can potentially use the credit card account data without further input from the consumer (e.g., the consumer may not be required to one or more credit accounts). Depending on the embodiment, the consumer may provide authorization to the digital wallet 180, the credit account extraction system 150, and/or the online retailer 170 to automatically complete a transaction using a highest priority credit account without the consumer providing further input regarding use of the credit account. Thus, different credit accounts of the consumer may be used for similar transactions on different days based on changes in attributes (e.g., credit limit, balance available, utilization, etc.) of one or more credit accounts.

In some embodiments, the digital wallet user interface of FIG. 8A (or other similar user interface) may also indicate the consumer's credit score, as provided in the consumer's credit data. Similarly, such a user interface may further provide controls and user interfaces for simulating credit scores in view of changes to the credit card account data illustrated, such as simulating a credit score in view of an increased balance on one or more credit cards.

FIG. 8B is an example user interface that may be used by the consumer to determine access rights to credit card account data in the consumer's digital wallet by various entities, such as retailers or groups of retailers. In the embodiment of FIG. 8B, the consumer may select particular retailers that are authorized to receive credit card account data from the digital wallet 180. In other embodiments, the consumer may provide authorizations for groups of entities, types of purchases, or entities based on other characteristics. Furthermore, in some embodiments the consumer can provide rules for providing credit card account data to particular entities and/or groups of entities. For example, consumer can provide a rule that a particular retailer (or type of retailer) includes only a highest prioritized credit card based on impact to the consumer's credit score, while another retailer (or type of retailer) receives credit information for any credit cards having an available balance that is sufficient to cover the proposed transaction, sorted according to available balance.

In some embodiments, the digital wallet 180 may also provide information regarding when the credit card account data of the consumer was provided and to whom it was provided. For example, the digital wallet may indicate that credit card account data was provided to a particular retailer on a particular date.

Figure 9:
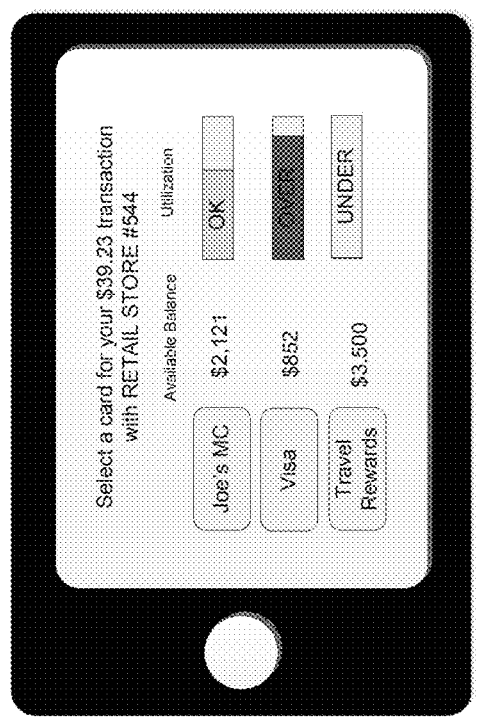
FIG. 9 is a sample user interface that may be provided on a mobile device as part of a monetary transaction, e.g., a purchase from a retail store, wherein the credit card accounts are selectable via a touchscreen user interface, for example, and utilization information is also provided.

FIG. 9 is a sample user interface that may be provided on a mobile device as part of a monetary transaction, e.g., a purchase from a retail store, wherein the credit card accounts are selectable via a touchscreen user interface, for example, and utilization information is also provided. A user interface similar to that of FIG. 9 may be provided to a consumer after the consumer has selected a product for purchase and has indicated that they are ready to check out (e.g., complete purchase of the product). Thus, the retailer can access either the consumers account with the digital wallet 180 or may request credit card account data from the credit account extraction system 150 in order to provide credit card options to the consumer. In the particular embodiment of FIG. 9, the consumer is provided with three credit card options; however, in other embodiments, such as those discussed above, the consumer may be provided with fewer or additional credit account options (e.g., such as based on prioritization or quantity limiting rules established by the consumer). In this embodiment, the consumer can select one of the indicated credit cards by touching on the credit card icon, e.g., the icons indicating "Joe's MC", "Visa", or "Travel Rewards," which may be nicknames provided by the consumer in an interface of the consumer's account with the digital wallet 180.

Figure 10:
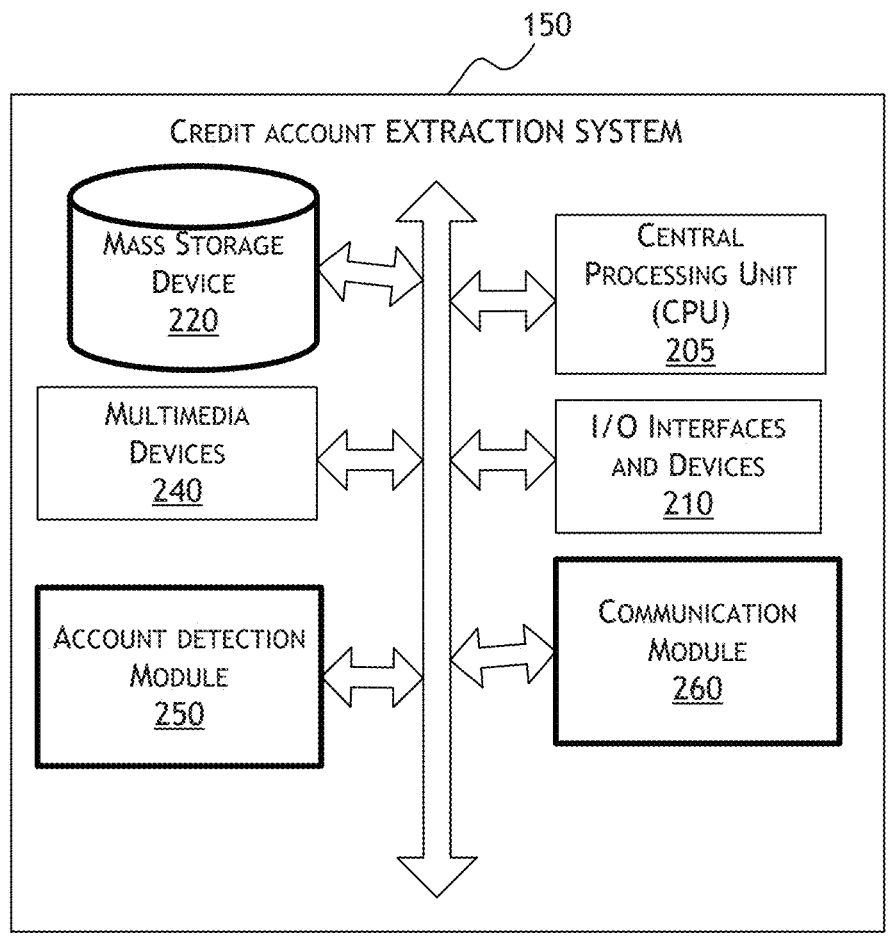
FIG. 10 is a block diagram illustrating one embodiment of a credit card extraction system.

FIG. 10 is a block diagram illustrating one embodiment of a credit card extraction system. Each of the systems discussed herein, e.g., the consumer 130, the online retailer 170, the digital wallet 170, and the credit bureau 120, may include some or all of the same or similar hardware components as are discussed herein with reference to the credit card extraction system 150 below. The functionality provided for in the components and modules of the credit account extraction system 150 may be combined into fewer components and modules or further separated into additional components and modules.

In general, the word module, as used herein, refers to logic embodied in hardware or firmware, or to a collection of software instructions, possibly having entry and exit points, written in a programming language, such as, for example, C, C++, or C#. A software module may be compiled and linked into an executable program, installed in a dynamic link library, or may be written in an interpreted programming language such as, for example, BASIC, C++, JavaScript, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In one embodiment, the credit account extraction system 150 includes, for example, a server or a personal computer that is IBM, Macintosh, or Linux/Unix compatible. In another embodiment, the credit account extraction system 150 comprises a laptop computer, smart phone, personal digital assistant, or other computing device, for example. In one embodiment, the exemplary credit account extraction system 150 includes a central processing unit ("CPU") 205, which may include one or more conventional or proprietary microprocessors. The credit account extraction system 150 further includes a memory, such as random access memory ("RAM") for temporary storage of information and a read only memory ("ROM") for permanent storage of information, and a mass storage device 220, such as a hard drive, diskette, or optical media storage device. In certain embodiments, the mass storage device 220 stores card registry account information, such as financials card information associated with financial cards of respective consumers. In one embodiment, the financial card information includes information regarding a card issuer that may be used to initiate cancellation of the respective financial card, among other information that uniquely identifies a particular financial card. In one embodiment, the card issuer information is retrieved from a credit file of the consumer so that the consumer is not required to manually provide the card issuer information. Typically, the modules of the credit account extraction system 150 are in communication with one another via a standards based bus system. In different embodiments, the standards based bus system could be Peripheral Component Interconnect (PCI), Microchannel, SCSI, Industrial Standard Architecture (ISA) and Extended ISA (EISA) architectures, for example.

The credit account extraction system 150 is generally controlled and coordinated by operating system and/or server software, such as the Windows 95, 98, NT, 2000, XP, Vista, 7, 8, Linux, SunOS, Solaris, PalmOS, Blackberry OS, or other compatible operating systems. In Macintosh systems, the operating system may be any available operating system, such as MAC OS X. In other embodiments, the credit account extraction system 150 may be controlled by a proprietary operating system. Conventional operating systems control and schedule computer processes for execution, perform memory management, provide file system, networking, and I/O services, and provide a user interface, such as a graphical user interface ("GUI"), among other things.

The exemplary credit account extraction system 150 may include one or more commonly available input/output (I/O) interfaces and devices 210, such as a keyboard, mouse, touchpad, and printer. In one embodiment, the I/O devices and interfaces 210 include one or more display device, such as a monitor, that allows the visual presentation of data to a user. More particularly, a display device provides for the presentation of GUIs, application software data, and multimedia presentations, for example. The credit account extraction system 150 may also include one or more multimedia devices 240, such as speakers, video cards, graphics accelerators, and microphones, for example. In one embodiment, the I/O interfaces and devices 210 comprise devices that are in communication with modules of the credit account extraction system 150 via a network, such as the network 160 and/or any secured local area network, for example.

Other

The various illustrative logical blocks, modules, and processes described herein may be implemented as electronic hardware, computer software, or combinations of both. To clearly illustrate this interchangeability of hardware and software, various illustrative components, blocks, modules, and states have been described above generally in terms of their functionality. However, while the various modules are illustrated separately, they may share some or all of the same underlying logic or code. Certain of the logical blocks, modules, and processes described herein may instead be implemented monolithically.

The various illustrative logical blocks, modules, and processes described herein may be implemented or performed by a machine, such as a computer, a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, a controller, microcontroller, state machine, combinations of the same, or the like. A processor may also be implemented as a combination of computing devices, e.g., a combination of a DSP and a microprocessor, a plurality of microprocessors or processor cores, one or more graphics or stream processors, one or more microprocessors in conjunction with a DSP, or any other such configuration.

The blocks or states of the processes described herein may be embodied directly in hardware, in a software module executed by a processor, or in a combination of the two. For example, each of the processes described above may also be embodied in, and fully automated by, software modules executed by one or more machines such as computers or computer processors. A module may reside in a computer-readable storage medium such as RAM memory, flash memory, ROM memory, EPROM memory, EEPROM memory, registers, hard disk, a removable disk, a CD-ROM, memory capable of storing firmware, or any other form of computer-readable storage medium known in the art. An example computer-readable storage medium can be coupled to a processor such that the processor can read information from, and write information to, the computer-readable storage medium. In the alternative, the computer-readable storage medium may be integral to the processor. The processor and the computer-readable storage medium may reside in an ASIC.

Depending on the embodiment, certain acts, events, or functions of any of the processes or algorithms described herein can be performed in a different sequence, may be added, merged, or left out altogether. Thus, in certain embodiments, not all described acts or events are necessary for the practice of the processes. Moreover, in certain embodiments, acts or events may be performed concurrently, e.g., through multi-threaded processing, interrupt processing, or via multiple processors or processor cores, rather than sequentially.

Conditional language used herein, such as, among others, "can," "could," "might," "may," "e.g.," and from the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the logical blocks, modules, and processes illustrated may be made without departing from the spirit of the disclosure. As will be recognized, certain embodiments of the inventions described herein may be embodied within a form that does not provide all of the features and benefits set forth herein, as some features may be used or practiced separately from others.

What is claimed is:

1. A computer-implemented method comprising:
    prior to an initiation of a transaction over the Internet between a consumer computing device and a third-party computing system:
        receiving, from the consumer computing device associated with a consumer, an indication of access authorization for the third-party computing system to access credit card account information of the consumer; and
        adding the third-party computing system to a list of access authorizations associated with the consumer in a database;
    receiving an indication of an initiation of the transaction between the consumer computing device and the third-party computing system; and
    in response to receiving the indication of the initiation of the transaction between the consumer computing device and the third-party computing system:
        retrieving the list of access authorizations from the database;
        determining that the third-party computing system is included in the list of access authorizations; and
        in response to determining that the third-party computing system is included in the list of access authorizations:
            accessing credit data within a credit file of the consumer stored in a credit database maintained by a credit bureau, wherein the credit database stores credit files for a plurality of consumers;
            identifying a plurality of credit card accounts included in the credit file of the consumer;
            automatically selecting a recommended credit card for the transaction from among the plurality of credit card accounts, wherein the recommended credit card is selected based on both (i) an identity of retailer involved in the transaction and (ii) rewards program information associated with the recommended credit card;
            causing display of a selectable option within a user interface presented on the consumer computing device in association with the transaction, wherein the selectable option enables the consumer to select to complete the transaction using the recommended credit card;
            receiving an indication of a user selection within the user interface of the selectable option; and
            transmitting credit card information corresponding to the recommended credit card to the third-party computing system to complete the transaction.

2. The computer-implemented method of claim 1, wherein the third-party computing system is a merchant computing system and credit card information transmitted to the third-party computing system is sufficient for the merchant computing system to initiate a charge using the credit card information to complete a purchase by the consumer.

3. The computer-implemented method of claim 1, wherein selectable options are displayed for two or more of the plurality of credit card accounts in the user interface.

4. The computer-implemented method of claim 3, further comprising determining a sorted display order of the two or more of the plurality of credit cards.

5. The computer-implemented method of claim 4, wherein the sorted display order is based at least in part on credit available on respective cards of the plurality of credit cards.

6. The computer-implemented method of claim 4, wherein the sorted display order is based at least in part on credit utilization on respective cards of the plurality of credit cards.

7. The computer-implemented method of claim 4, wherein the sorted display order is based on rewards programs of respective cards of the plurality of credit cards.

8. The computer-implemented method of claim 1, further comprising receiving an indication from the consumer indicating sharable portions of credit card information.

9. The computer-implemented method of claim 8, wherein a first portion of credit card information is indicated to be shareable with a first type of third party, wherein a second portion of credit card information is indicated to be shareable with a second type of third party.

10. The computer-implemented method of claim 1, further comprising:
    determining a credit format associated with the third-party computing system; and converting at least a portion of credit card information to the credit format associated with the third-party computing system.

11. The computer-implemented method of claim 1, further comprising generating user interface data configured for execution by the consumer computing device to display indications of one or more credit cards that are selectable via a user interface to add to the list of access authorizations.

12. A computing system comprising:
   memory; and
   one or more processors configured to perform operations comprising at least:
      prior to an initiation of a transaction over the Internet between a consumer computing device and a third-party computing system:
         receiving, from the consumer computing device associated with a consumer, an indication of access authorization for the third-party computing system to access credit card account information of the consumer, wherein the computing system is operated by a different entity than the third-party computing system and is remotely located from the third-party computing system; and
         adding the third-party computing system to a list of access authorizations associated with the consumer in a database;
      receiving an indication of an initiation of the transaction between the consumer computing device and the third-party computing system; and
      in response to receiving the indication of the initiation of the transaction between the consumer computing device and the third-party computing system:
         retrieving the list of access authorizations from the database;
         determining that the third-party computing system is included in the list of access authorizations; and
         in response to determining that the third-party computing system is included in the list of access authorizations:
            accessing credit data within a credit file of the consumer stored in a credit database maintained by a credit bureau, wherein the credit database stores credit files for a plurality of consumers;
            identifying a plurality of credit card accounts included in the credit file of the consumer;
            automatically selecting a recommended credit card for the transaction from among the plurality of credit card accounts, wherein the recommended credit card is selected based on both (i) an identity of retailer involved in the transaction and (ii) rewards program information associated with the recommended credit card;
            causing display of a selectable option within a user interface presented on the consumer computing device in association with the transaction, wherein the selectable option enables the consumer to select to complete the transaction using the recommended credit card;
            receiving an indication of a user selection within the user interface of the selectable option; and
            transmitting credit card information corresponding to the recommended credit card to the third-party computing system to complete the transaction.

13. The computing system of claim 12, wherein the third-party computing system is a merchant computing system and credit card information transmitted to the third-party computing system is sufficient for the merchant computing system to initiate a charge using the credit card information to complete a purchase by the consumer.

14. The computing system of claim 12, wherein selectable options are displayed for two or more of the plurality of credit card accounts in the user interface.

15. The computing system of claim 14, wherein the operations further comprise determining a sorted display order of the two or more of the plurality of credit cards.

16. The computing system of claim 15, wherein the sorted display order is based at least in part on credit available on respective cards of the plurality of credit cards.

17. The computing system of claim 15, wherein the sorted display order is based at least in part on credit utilization on respective cards of the plurality of credit cards.

18. The computing system of claim 15, wherein the sorted display order is based on rewards programs of respective cards of the plurality of credit cards.

* * * * *